Dec. 26, 1961 A. J. HERARD ETAL 3,014,505
LOOMS OPERATING WITH STATIONARY WEFT SUPPLIES
Filed Sept. 8, 1959 4 Sheets-Sheet 1
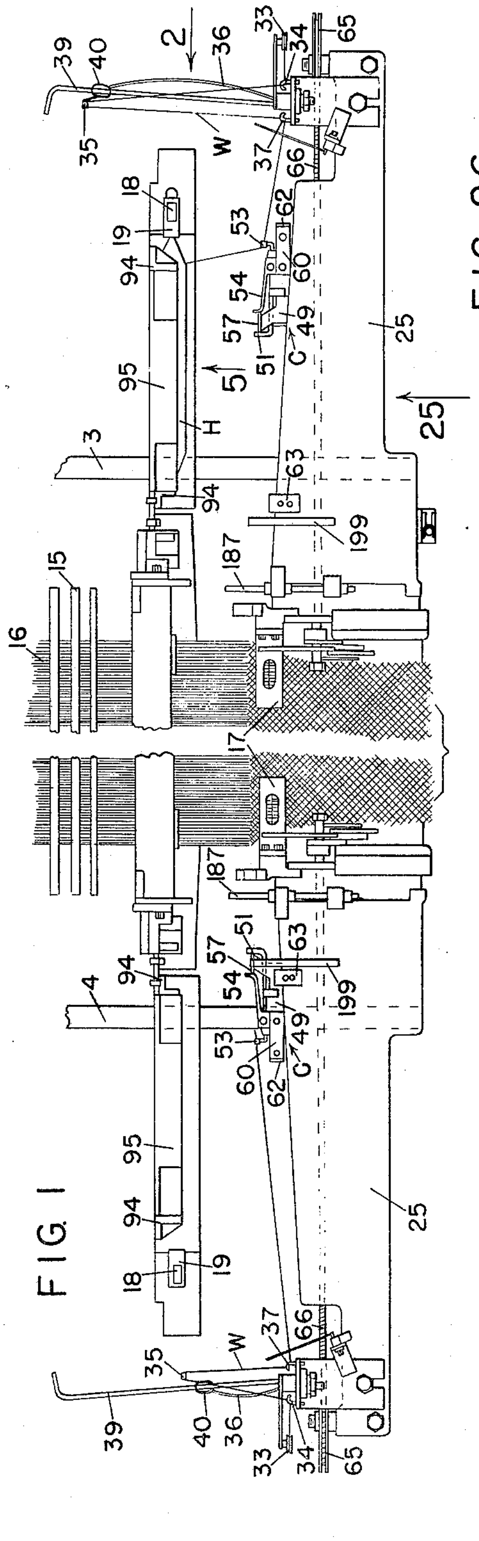
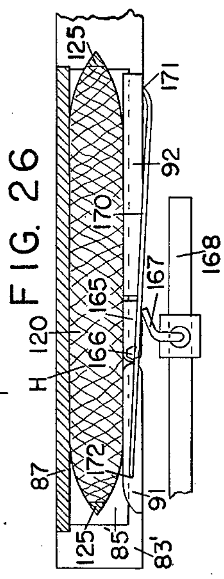
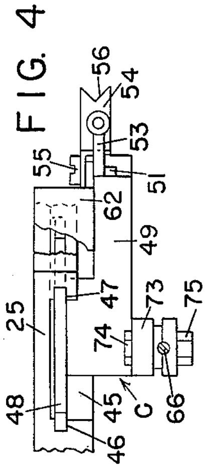
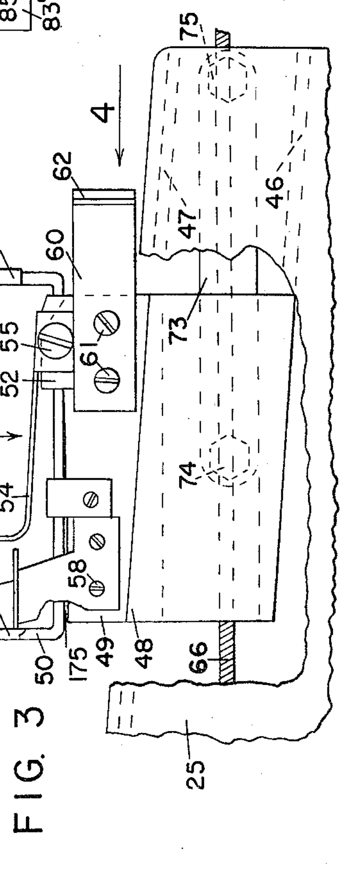

LOOMS OPERATING WITH STATIONARY WEFT SUPPLIES

Filed Sept. 8, 1959 4 Sheets-Sheet 2

INVENTORS
ARCHIBALD J. HERARD
CLARENCE R. KRONOFF
HERBERT A. WHITIN
Charles T. Hawley
ATTORNEY

LOOMS OPERATING WITH STATIONARY WEFT SUPPLIES

Filed Sept. 8, 1959 4 Sheets-Sheet 3

United States Patent Office 3,014,505

Patented Dec. 26, 1961

3,014,505

LOOMS OPERATING WITH STATIONARY WEFT SUPPLIES

Archibald J. Herard, Auburn, Clarence R. Kronoff, Worcester, and Herbert A. Whitin, Auburn, Mass., assignors to Crompton & Knowles Corporation, Worcester, Mass., a corporation of Massachusetts Filed Sept. 8, 1959, Ser. No. 838,556

21 Claims. (Cl. 139—126)

Figures 2, 5, 6, 9, 10, 19, 20, 21, 22:
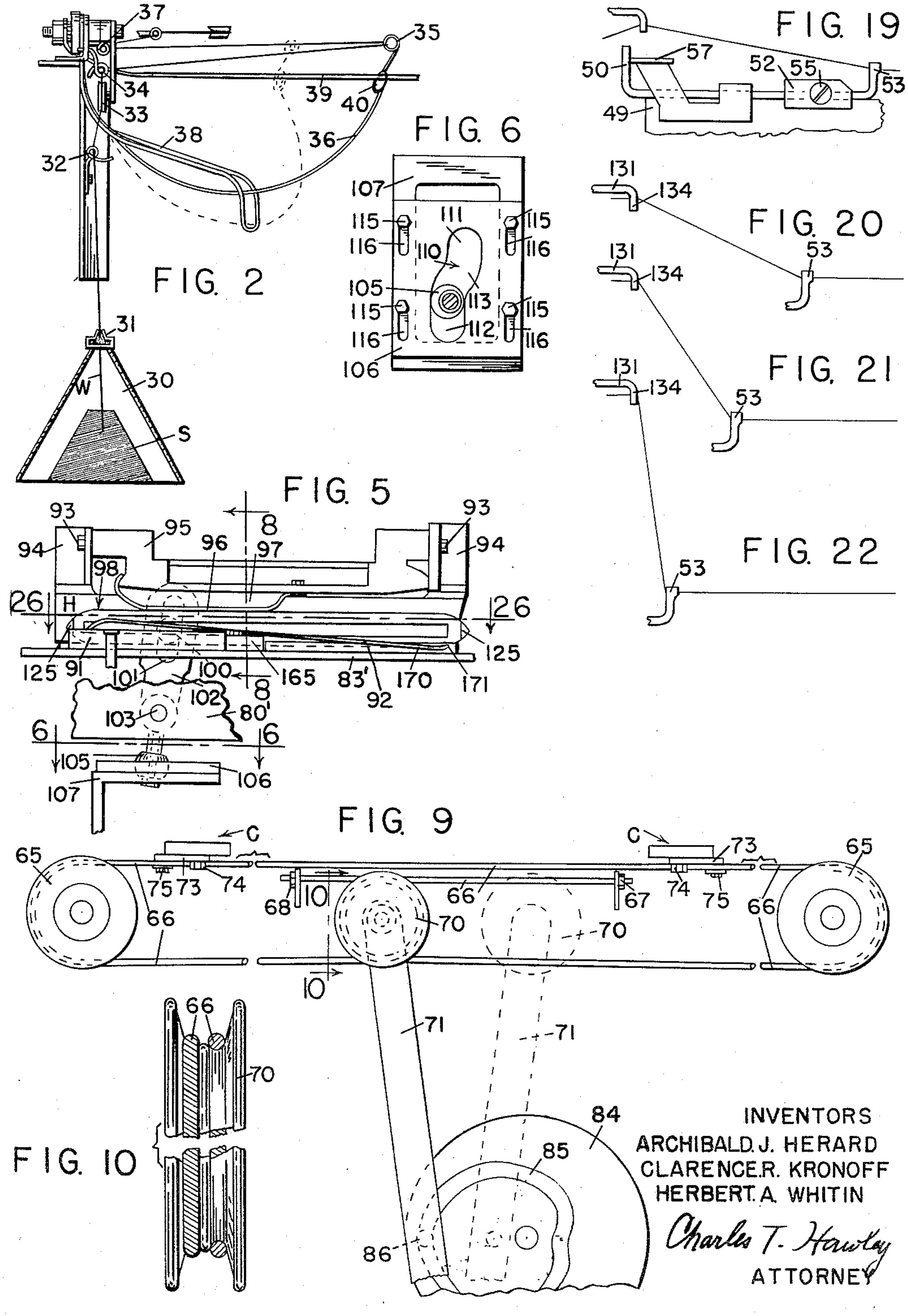

This invention relates to looms operating with stationary outside weft supplies from which picks are introduced into the warp sheds by a shuttle having grippers to which the weft is attached.

Looms of this general type ordinarily employ small shuttles which require a system of guides extending across the loom to prevent the shuttle from twisting in its flight. Such guides are in front of the beat-up reed and some arrangement must be made to prevent them from striking the fell of the cloth at the time of beat-up. This may be done by pivoting the lay around a center so located that as the reed beats up the guides will pass under the cloth.

It is an important object of the present invention to provide a loom of the type specified wherein a shuttle of the free flight variety may be employed for the purpose of dispensing with the aforesaid guides. In a loom made according to this feature of the invention the lay may be provided with the usual raceplate along which the shuttle travels and weft beat-up by the reed will be the same as the ordinary beat-up. The lay is pivoted as in the ordinary loom and can be of the 1 x 1 type having a single shuttle box at each end. The shuttle can be received by a box and picked from it under conditions very similar to those existing in the ordinary weft supply carrying free shuttle flight type looms.

The shuttle employed in the present invention has weft gripping jaws at each end thereof which project forwardly to receive the weft which is temporarily held by a thread clamp. It is a further object of the invention to provide improved means for transferring the weft from the thread clamp to the gripping jaws without requiring special mechanism for opening the clamp incident to the weft transfer. This expedient is attained by making the shuttle carrying gripping jaws stronger than the thread clamp so that it can pull the weft away from the clamp.

It is a further object of the invention to provide a carrier which moves generally in the direction of the length of the lay but in front of and independent of it, the carrier mounting the aforesaid clamp and also being provided with a guide eye spaced transversely of the loom from the clamp to hold a section of the weft in proper position for presentation to the jaws on the shuttle. The thread at each end of the loom remains permanently in the guide eye at that end.

It is a further object of the invention to provide means for moving the carrier from a position remote from the selvage to a position adjacent to the selvage, this motion of the carrier being controlled in such manner that the clamp and guide eye will be stationary at the time of transfer of weft to the shuttle jaws when the carrier is in its remote position and acting also to hold the carrier stationary in its adjacent position for the next succeeding beat-up of the loom to permit reclamping of the weft by the clamp on the carrier. As soon as the weft is cut from the selvage the carrier then moves outwardly to its remote position to be in thread transfer position on the next beat-up.

Many looms of the general type set forth herein are made in such manner that the shuttle when picked must set into motion the full length of the weft from the gripping jaw all the way back to the weft supply. This quick motion places undue strain on the weft which has a tendency to pull the weft out of the gripping jaws. It is a further object of the present invention to provide means by which part at least of the weft will be moving at the time the shuttle is picked so that only a part of its inertia will have been overcome by the shuttle. This result is accomplished as set forth hereinafter by having the carrier move toward the adjacent selvage from its remote position as the lay swings backwardly preparatory to picking. The thread passing through the guide eye is therefore required to be set in motion due to backward movement of the lay combined with inward motion of the guide eye.

In order to effect proper transfer of weft from the carrier mounted clamp to the gripping jaws of the shuttle it is necessary that the latter be located at a point more distant from the adjacent selvage than the clamp at the instant of transfer. This condition is effected as will be described hereinafter by causing the shuttle box to be moved in an outward direction away from the cloth before the lay reaches front center. During this operation the shuttle will be moved against the picker which will act as a stop to locate the jaws in correct position for receiving the weft extending from the clamp to the guide eye.

A further object of the invention is to provide means for shifting the shuttle box lengthwise of the lay to move the box from its shuttle receiving position away from the cloth to the shuttle picking position. The box moving means holds the shuttle box in a fixed position with respect to the lay until after the time of picking to insure proper propulsion of the shuttle by the picker. This feature of the invention includes means actuated by motion of the lay effective to delay motion of the shuttle box away from the cloth until after ample time has passed for reception of the shuttle and also to delay return of the shuttle box to its shuttle receiving position until after the picking operation has been completed.

It is a further object of the invention to provide a stationary supply of weft at each end of the loom and to provide a shuttle which has gripping jaws at each end thereof, the jaws at one end to be connected to weft of the package at one side and the jaws at the other end of the shuttle being connected to the weft supply of the package at the opposite end of the loom. In this way two different wefts can be used to weave pick and pick fabrics such for instance as sharkskin. Both packages of weft can of course be of the same kind in which case the successive picks of weft being drawn alternately from the stationary supplies would provide a mixing or blending of the weft.

One of the aforesaid carriers will be located at each end of the loom and their operations will be similar to each other except that they will be out of phase by one beat of the loom. Because of this fact it is possible to use a common actuator to move the carriers. Thus, when the shuttle is at the right end of the loom, for instance, the carrier at that end will be in its remote position but at this time in the loom operation the carrier at the opposite end should be in the adjacent position so that its clamp can be reconnected to the weft which has been drawn from the supply at said other end. When the carrier at the right end has been moved to its adjacent position the carrier at the other end should be in thread transfer position or in its remote position. This condition permits the use of a single-acting means which as described herein includes a cable having its ends fixed and trained around pulleys, one at each end of the loom and also trained around a movable system of pulleys, the carriers being fastened to the cable and moved in a manner already mentioned as the system of pulleys moves first to one side and then to the other.

When a carrier is in its remote position its clamp must be spaced from the reed line by at least the thickness of the shuttle behind the clamp, but when the carrier is in its adjacent position the clamp must extend slightly behind the reed line to insure proper pick-up of the thread by the clamp. In order to provide for these two positions of the clamp it is a further object of the invention to provide oblique guide means for each carrier which will enable its thread clamp to be at the proper distances from the reed line.

While the shuttle used with the present invention is of the free flight type it differs somewhat from the usual free flight shuttle in that it has a reduced height and can be made with a reduced width, but the length should be sufficient to enable the shuttle to remain stable in its flight across the raceplate. This feature of stability is dependent more on the length of the shuttle than on its height or width.

Figure 7:
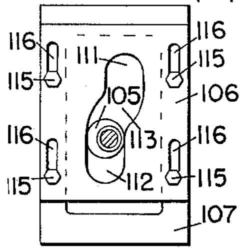
Figure 11:
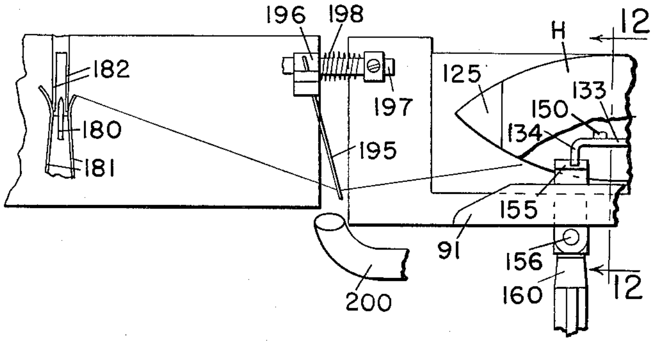
Figures 8, 12, 23:
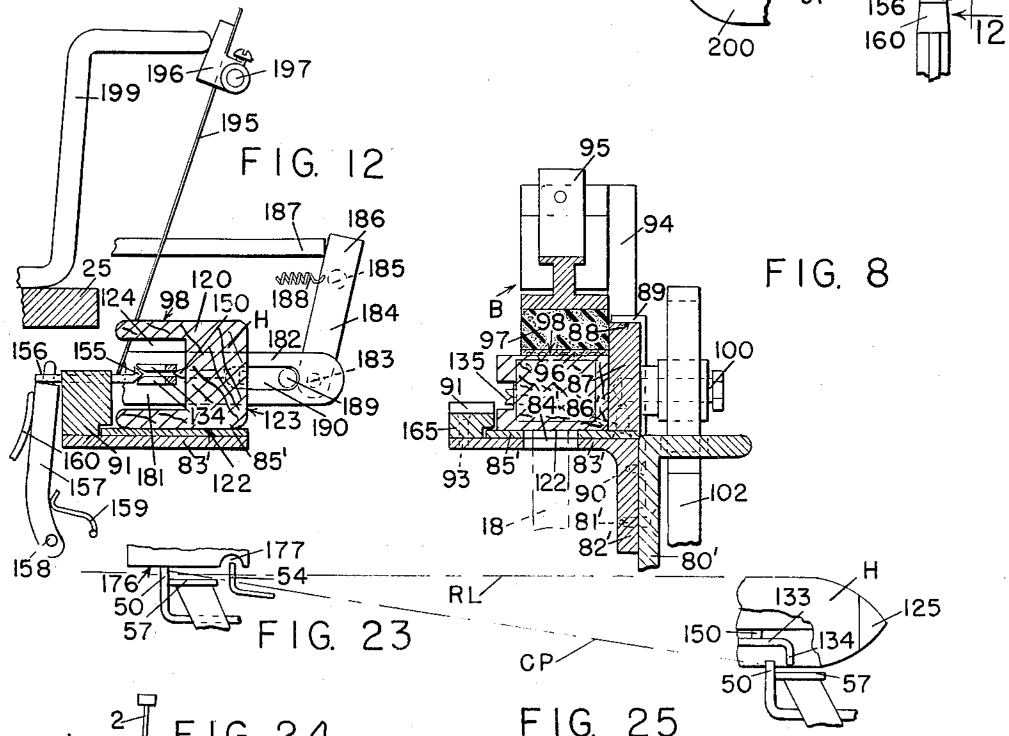
Figure 24:
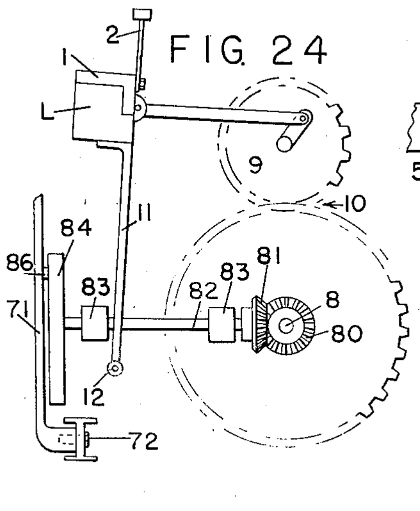
Figure 25:
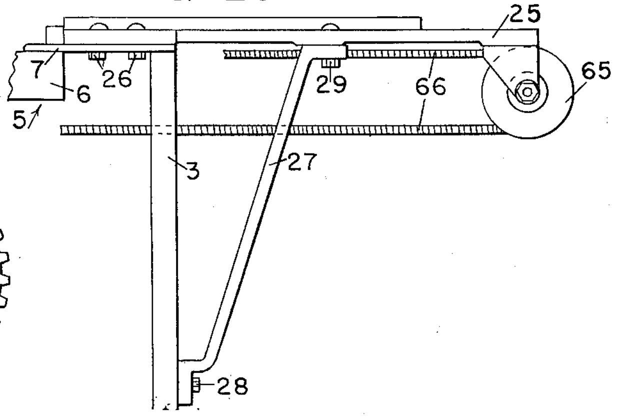
Figures 13, 14, 15, 16, 17, 18, 27, 28, 29:
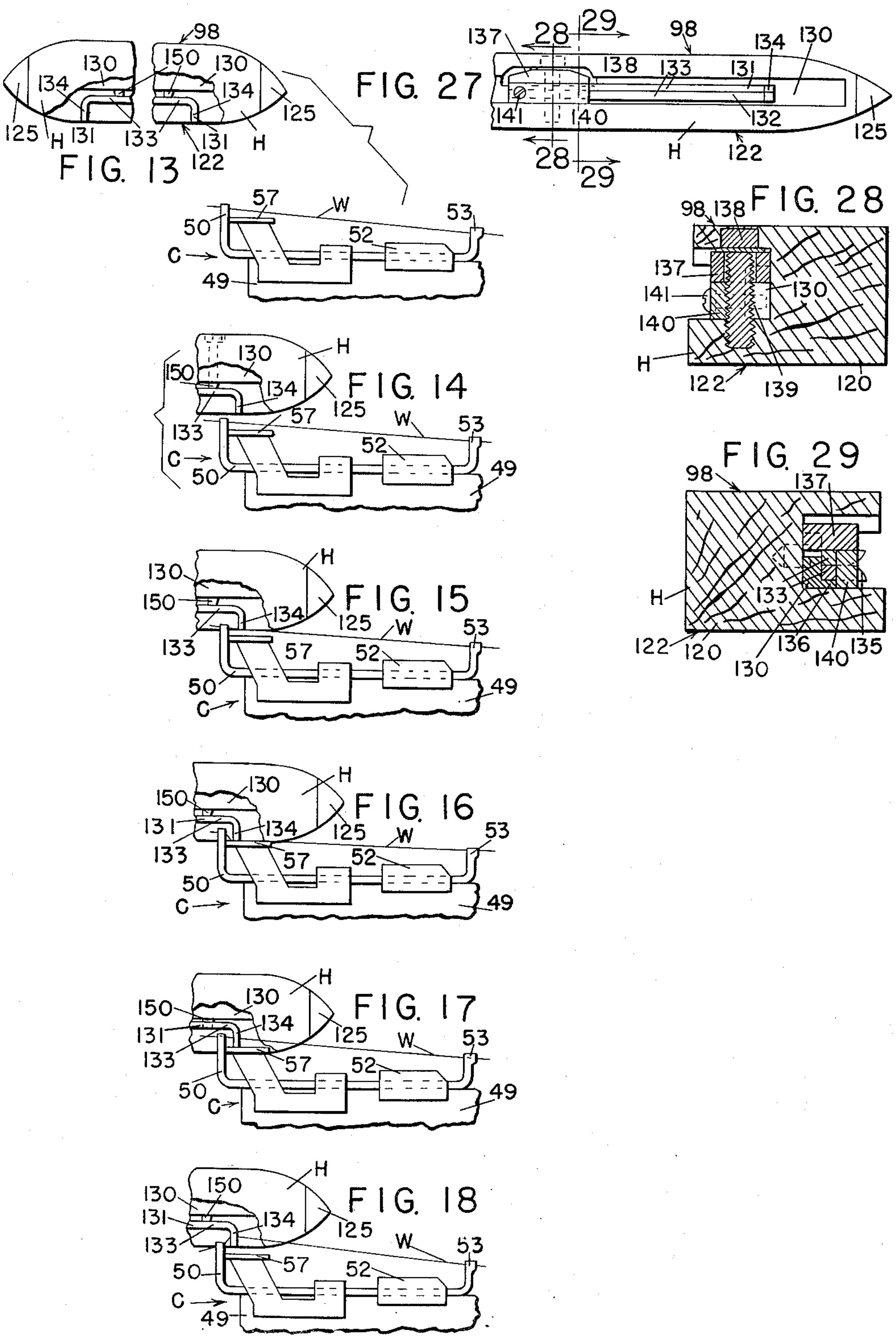

In order that the invention may be clearly understood reference is made to the accompanying drawings which illustrate by way of example the embodiments of the invention and in which:

FIG. 1 is a plan view facing the back of the loom showing the mechanism at the right-hand side in picking position just prior to picking the shuttle from right to left, FIG. 2 is an end view looking in the direction of arrow 2, FIG. 1, showing the tension and slack take-up for the weft at the right-hand side, FIG. 3 is a detail plan view of the carrier with part of the end casting or support broken away exposing the top plate which slides along grooves in the support, FIG. 4 is an end view looking in the direction of arrow 4, FIG. 3, FIG. 5 is a detail rear view looking in the direction of arrow 5, FIG. 1, showing the shuttle box and also the cam and cam lever, FIG. 6 is a horizontal section on line 6—6, FIG. 5, showing the cam plate forward, FIG. 7 is a view similar to FIG. 6 but showing the camplate moved back, FIG. 8 is an enlarged vertical section on line 8—8, FIG. 5, FIG. 9 is a diagrammatic view looking towards the back of the loom showing the pulleys, cable, cam lever and cam for moving the two carriers, FIG. 10 is a vertical section on line 10—10, FIG. 9, showing the movable double groove pulley, FIG. 11 is a detail plan view showing means for releasing, cutting and removing the thread at the trailing end of the shuttle, FIG. 12 is a vertical section on line 12—12, FIG. 11, FIGS. 13–18 are diagrammatic views showing the sequence of action in transferring the thread from the carrier clamp to the shuttle jaws, FIG. 13 representing the shuttle before it is moved against the picker, FIGS. 19–22 are diagrammatic views showing the relative positions of the gripper jaw of the shuttle and the guide eye of the carrier before the time of shuttle picking, FIG. 23 is a diagrammatic view showing the oblique path of travel of the carrier relative to the reed line at front center, FIG. 24 is a diagrammatic view showing the lay and its drive and the gearing involved in obtaining 2-pick timing of the carrier actuator, FIG. 25 is a detail front elevation looking in the direction of arrow 25, FIG. 1, FIG. 26 is a longitudinal horizontal section on line 26—26, FIG. 5, showing the protection at the shuttle box and also a guide wire to prevent the thread from catching on any of the various structures in front of the shuttle box, FIG. 27 is a front elevation of the right-hand end of the shuttle used with the invention, the other end of the shuttle being the same as shown but of the opposite hand, and FIGS. 28 and 29 are enlarged vertical sections on line 28—28 and 29—29 respectively, FIG. 27.

The loom to which the present invention has been applied has many features in common with the ordinary fly shuttle loom. It has a lay L, see FIG. 24, which is reciprocated backwardly and forwardly by the usual driving mechanism and this lay has a raceplate 1 and the usual reed 2 for beating up the weft. The loom includes in its construction right and left-hand loomsides 3 and 4 forming part of the rigid frame of the loom and included in this frame is a breastbeam shown herein as of angle iron form designated generally at 5 and having a vertical flange 6 and a horizontal flange 7 which extends over and is secured to the loomsides. The loom has a bottom shaft 8 and top or crankshaft 9 connected by gearing designated generally at 10 so proportioned that the bottom shaft turns once for each two rotations of the shaft 9. The lay is mounted on layswords 11 which are pivotally mounted in their lower ends at 12 in usual manner. Other features of the loom not specifically shown, such as warp supply and cloth takeup, may be of standard construction. The loom also has harness mechanism 15 for forming sheds of the warp threads 16. The loom also has temples 17 for spreading the cloth and furthermore is provided with the usual picking mechanism including a stick 18 at each side of the loom to operate the pickers 19 for the purpose of propelling the shuttle.

The features thus far mentioned may be varied but will in general follow usual loom construction. The picker sticks operate alternately to pick the shuttle first from one side, then from the opposite side, and there is one shuttle in the loom.

In carrying the invention into effect each side of the loom is provided with an elongated support 25 which as shown in FIGS. 1 and 25 is secured at 26 to the breastbeam or frame of the loom and is also provided with a brace 27 secured to the adjacent loomside at 28 and extending upwardly for attachment at 29 to a part of the support beyond the loomside.

The mechanisms at the ends of the loom are substantially the same except that they are of opposite hands and the following description will be directed more particularly to the mechanisms at the right-hand side of the loom as viewed in FIG. 1, but with the understanding that this description will apply also to mechanisms at the left-hand end of the loom.

Each side of the loom is provided with a stationary weft supply S, see FIG. 2, which may be mounted on the floor on which the loom is mounted and, if desired, be enclosed in a conical structure 30 the upper end of which is provided with a friction tension 31 through which the weft W passes as it is unwound from the supply S. The weft then extends upwardly through a fixed eye 32 and a second tension 33 and then passes through another fixed eye 34. From the eye 34 the weft passes to and through a movable eye 35 on the upper free end of a spring wire tension 36 and the weft then passes through still another fixed eye 37 and thence to the carrier to be described more in detail hereinafter.

Two means are provided for confining the resilient wire 36, one of these being the lower guard 38 which may be looped as suggested in FIG. 2 and the other of which 39 is a rigid bar or wire. The wire 36 has a positioning eye 40 formed in it through which the guide 39 passes. The spring wire 36, the guard 38 and the guide 39 are appropriately fastened with respect to the loom frame at their left-hand ends as viewed in FIG. 2. During operation of the loom the eye 35 and spring wire 36 will move between their full line and their dotted line positions indicated in FIG. 2, the extent of this motion being sufficient to maintain tension of the weft as the carrier moves from its position adjacent the selvage to its position remote from the selvage, as will be described hereinafter.

The carrier previously mentioned is shown in FIGS. 3, 4, 9 and 19. It is mounted for sliding motion on the under side of the support 25. The support has a downwardly opening slot 45 provided at its edges with slots 46 and 47 into which fit a plate 48 secured to the body 49 of the carrier designated generally at C. Extending rearwardly from the body 49 are two clamps 50 and 51 in vertical alignment and mounted so that they can spread apart. These clamps are secured to a block 52 on the body 49 to which is also secured a guide eye 53. A resilient thread placer 54 is secured to the block at 55 and has a V notch 56 into which the weft thread passes for accurate placement of the thread with respect to the clamps. There is also a jaw abutment plate 57 held at 58 to the body 49 for a purpose to be described. A stop plate 60 is held to the body at 61 and has upturned end 62 for engagement with a stop 63 fixed with respect to the loom, preferably on the support 25, to limit motion of the carrier toward the adjacent selvage.

The slot 46 is oblique with respect to the reed line when the lay is on front center, being directed to the left and rearwardly as viewed in FIG. 3 and indicated diagrammatically in FIG. 23 where the reed line RL is an extension of the front surface of the reed and the back of the shuttle box yet to be described when the lay is on front center. In FIG. 23 it will be seen that the thread clamps 50 and 51 are considerably forward of line RL when the carrier is in its outer remote position with respect to the cloth and that the clamps are slightly behind the reed line when the carrier is in its inner adjacent position near the cloth. Line CP, FIG. 23, represents the path of the carrier. Further description of this relation will be given hereinafter.

This means for moving the carrier is so made that it can operate the carriers at each end of the loom. Each of the supports 25 has rotatably mounted on the outer end thereof a guide pulley 65 around which is trained a cable 66. As shown in FIG. 9 the ends of the cable are held fixed by holders 67 and 68 and the cable is trained around a 2-space pulley 70 rotatable on the upper end of a lever 71, see FIGS. 9 and 10, pivoted around an axis 72, see FIG. 24. Each carrier is connected to the cable by means of a link 73 pivoted at 74 to the under side of the body 49 and having a pivotal connection 75 with the cable, see FIG. 3.

As viewed in FIG. 9 the cable extends from the right-hand holder 67 to the left around one of the grooves of the pulley 70 and then to the right around the right-hand pulley 65, thence to the left around the left-hand pulley 65 and then to the right around the other groove of the pulley 70 and then to the left-hand holder or anchor 68.

The bottom shaft has a mitre gear 80 which meshes with another mitre 81 on the rear end of a horizontal shaft 82 rotatably mounted in fixed bearings 83. The forward end of shaft 82 has secured thereto cam 84 provided with a slot 85 which receives a roll rotatable on the lever 71. As the loom operates the cam 84 is given a complete rotation every second beat so that the carriers each require two beats of the loom for a complete reciprocation, but it will be noted that the motions of the carriers with respect to the cloth are out of phase by one beat of the loom, that is, when one carrier moves outwardly from the cloth the other carrier moves inwardly toward the cloth. The lever 71 rocks back and forth more or less in a vertical plane but the links 73 permit the carriers to have their oblique motions as set forth diagrammatically in FIG. 23.

Each end of the lay is provided with a shuttle box but the boxes are mounted to slide endwise of the lay instead of being fixed to the latter as in the usual 1x1 loom. The reason for mounting the boxes to slide endwise is to enable them to be in a position toward the adjacent selvage, or shuttle receiving position when the shuttle is boxed and then move outwardly toward picking position until the shuttle engages the picker and is held against further outward movement. If the shuttle should strike the picker before the end of the box motion is completed then the box will slide along the shuttle. The reason for insuring this position of the shuttle is that the latter has thread gripping jaws which must sustain a certain relation with respect to the previously mentioned clamp before the weft can be transferred from the latter to the shuttle.

Referring to FIGS. 5, 6, 7 and 8, the layend 80′ which extends beyond the lay away from the reed has secured thereto at 81′ a bracket 82′ having a box support part 83′ provided with a slot 84′ for the picker stick. Slidable on the top of the support 83′ is the base plate 85′ of the box structure designated generally at B. This base plate is fastened at 86′ to a vertical box back 87 which has a flat upper surface 88 parallel to the lay. Overhanging surface 88 and in sliding contact with it is a guard 89 the lower end of which is secured at 90 to the vertical part of the bracket 82′. A second guard for the base plate includes two aligned but longitudinally spaced box fronts 91 and 92 secured to the forward part of the support 83′ and overhanging the forward edge of the base plate 85′ as shown in FIGS. 26 and 8. The two guards permit the shuttle box to slide endwise with respect to the lay but prevent it from objectionable upward displacement. The box fronts are low so as not to interfere with the thread which is attached to the shuttle jaws to be described hereinafter.

Secured at 93 to upward extensions 94 of the box back 87 is a shuttle binder or box top 95 having a shuttle engaging check 96 secured to the under side thereof. The check may comprise a strip of leather fastened at its ends to the binder 95 and being backed up by sponge rubber or the like 97. The check 96 is positioned to engage the top surface 98 of the shuttle H.

Extending rearwardly from and secured to the box back 87 is a stud 100 which extends through a slot 101 in the upper end of a lever 102 pivoted at 103 to a part of the layend 80′. The lower end of lever 102 has mounted thereon a ball 105 which cooperates with a sliding plate 106 mounted for back and forth motion on a fixed support 107. Rocking of the lever 102 around its pivot 103 causes endwise motion of the shuttle box, the box being moved to its outer or picking position when the lever is rocked to the right, the position shown in FIG. 5, and the box being returned to its inner shuttle receiving position (not shown) when the lever 102 is moved to the left from the position shown in FIG. 5.

The rocking motions of lever 103 are derived from motion of the lay and also the slide plate 106. The latter plate has a slot therein designed at 110 having a rear straight part 111 and a front straight part 112 joined by an intermediate inclined part 113. The ball 105 fits snugly in this slot and as the lay advances with the shuttle box in its inward shuttle receiving position the plate 106 will be in its forward position determined by stop screws 115 in slots 116. Forward motion of the lay will cause the ball 105 to move from the straight part 111 along the incline 113 to the left to the other straight part 112 of the slot, thereby rocking the lever to the right and sliding the shuttle box along the lay from a shuttle receiving position to its picking position. During this sliding motion of the box the shuttle will engage the picker 19 and be held against further outward endwise motion, but the box may continue to have a slight outward motion, in which event it will slide along the shuttle.

At the beginning of the rearward motion of the lay after it has passed its front center position, the block 106 will be in the position shown in FIG. 6 but as the lay continues to move rearwardly the ball 105 will engage the incline part 113 the effect of which is to slide plate 106 rearwardly on support 107 to change the relation of the stop screws 115 with respect to the slots 116. During this part of the rearward motion of the lay the lever is not rocked and ball 105 is in straight slot part 112, thereby holding the box against motion during picking. Continued rearward movement will effect a right-hand motion of the ball 105 which will return the shuttle box to its shuttle receiving position.

The lost motion on the part of the plate 106 has the effect of holding the roll 105 in the forward straight part 112 slot and delaying inward motion of the box until after picking. At back center plate 106 will still be in the position shown in FIG. 7, but during the first part of the ensuing forward motion of the lay the ball 105 will move plate 106 to the position of FIG. 6. When the shuttle is in the box it tends to resist motion of the box and this aids the ball 105 to move plate 106 rearwardly for the lost motion.

The shuttle used in the present invention is shown more particularly in FIGS. 5, 12 and 26–29. The shuttle has a body 120 having the previously mentioned top 98 and a bottom 122, see FIG. 12, to engage respectively the binder and base plate of the shuttle box. The shuttle also has a back wall 123 to engage the box back and is provided along its front with a lengthwise slot 124. The ends of the shuttle are provided with tips 125 of the usual kind for engagement with pickers 19.

Secured to the shuttle at the back of the slot 124 is an elongated metallic plate 130 which supports upper and lower thread gripping jaws 131 and 132, respectively. These jaws have elongated shanks 133 and forwardly extending parts 134 which are beveled as shown at 135, FIG. 29.

FIG. 27 shows one end of the shuttle and the jaws at that end and FIGS. 28 and 29 are enlarged sections, but it is to be understood that the mechanism shown in these three views will be duplicated at the other end of the shuttle except that they will be of opposite hand.

As shown in FIG. 29 the plate 130 has a forwardly extending projection 136 on which the shanks 133 rest. A top clamp 137 extends over the shanks and bears down on them holding them against the extension 136 when screw 138 is tightened. This screw passes freely through the clamp 137 but is tapped into a half thread 139 in the plate 130 and also in a half thread in a second clamp 140. This second clamp is drawn tightly against the forward parts of the shanks by screw 141 which is tapped into the plate 130. The two jaws thus mounted are held together by their resilience as indicated in FIG. 29 and also in relative forward position with respect to the slot 124, but can be spread apart and can also be bent with respect to the shuttle.

The shuttle has a wedge 150 fixed therein which is effective when the jaws are sprung backwardly with respect to the shuttle to separate them to receive a thread, see FIGS. 12 and 14. This wedge is behind the jaws or to the right of them as viewed in FIG. 12. It operates on the jaws when the shuttle is in its picking position and the carrier is in its remote position by engagement of the forward ends of the jaws with the abutment plate 57 as the lay beats up to front center.

Another means is provided for opening the jaws at the trailing end of the shuttle after it has been boxed, this means being shown in FIG. 12 and including another wedge 155 slidably mounted back and forth on the inner box front 91, see FIG. 11, and having an operating connection 156 with the upper end of lever 157 pivoted at 158 to the lay structure. A relatively weak spring 159 tends to push the lever 157 forwardly or to the left as viewed in FIG. 12 so that the wedge 155 is withdrawn except when the lay is in its foremost position at which time engagement of lever with a fixed abutment 160 moves the lever 157 and wedge 155 rearwardly to separate the upper and lower jaws 131 and 132 to release the thread which has been drawn by the shuttle through the warp shed.

As shown in FIG. 26 a protector finger 165 is pivoted at 166 to the horizontal part 83′ of the bracket 82′ and is pushed forwardly by the shuttle as the latter enters the box to engage a finger 167 extending upwardly from the protector rod 168. Failure of the shuttle to enter the box will permit the protector finger to be in the box and incapable of rocking the finger 167 with resultant loom stoppage. A guide wire 170 for the thread secured at its outer end as at 171 to the outer box front 92, extends to the left over the finger 167 and is secured at 172 in the top of the box front part 91. This wire prevents the weft from becoming entangled with the box fronts and protector finger as the jaws on the shuttle draw the thread out of the box at picking.

The carrier on which the clamps 50 and 51 are mounted has a wedge to separate the clamps, this wedge being indicated at 175. The lay has an abutting surface 176, see FIG. 23, for engagement with the clamps as the lay approaches front center position to move them against the wedge 175 and cause the latter to separate them so that they can be opened to receive the thread which has just been drawn into the shed by the shuttle. The carrier at this time is in its adjacent position. This abutting surface 176 is somewhat behind the reed line RL. At one side of the abutting surface 176 there is a vertical open space 177 in which the thread placer 54 can move to insure proper placement of the thread with respect to the clamps and also insure drawing the thread taut enough to enable it to pass between the clamps when the latter are opened, as already described.

In the operation of the mechanism above described as set forth in FIGS. 13 to 18 it may be assumed that the shuttle has just emerged from the right-hand side of the warp shed and has entered the shuttle box while the latter is being held in its receiving position by the roll 105 and plate 106. This will locate the gripper jaws 131 and 132 to the left of the clamps 50 and 51. It is assumed that the weft W from the supply is held by the clamps and has been threaded into the guide eye 53 and is positioned by the thread placer 54. As the lay continues to advance the shuttle will approach the carrier and will also be pushed to the right, FIG. 13, by engagement of the roll 105 and the incline 113 in plate 106, as already described. This will place the shuttle in its picking position with the right-hand tip against the picker as shown in FIG. 1 before the lay reaches its extreme forward position with the parts placed as indicated diagrammatically in FIG. 14, the jaws on the shuttle being behind the weft and spaced from the abutment plate 57. The lay continues to move forwardly and reaches the position shown diagrammatically in FIG. 15 where the weft is able to enter between the beveled forward ends 135 of the jaws and further advance of the lay moves the parts to the position shown in FIG. 16 with the jaws still closed but just engaging the abutment plate 57 on the carrier, the weft being deflected forwardly from the clamps toward the jaws. A slight further forward motion of the lay will cause the jaws to be bent rearwardly so that the wedge 150 can separate the jaws and the thread due to action of the tension and pick-up shown in FIG. 2 can then snap rearwardly between the jaws as shown in FIG. 17. The lay is now on its front center position and as it begins its rearward motion as indicated in FIG. 18 the jaws will move rearwardly with the shuttle and away from the abutment plate 57 so that they can close on the thread. The jaws 131 and 132 are stronger than the clamps 50 and 51 and are able to pull the thread out of the clamp.

The operation now proceeds as indicated diagrammatically in FIGS. 19 to 22. The carrier will be in its remote position at the time of transfer of weft from the clamps to the jaws and the thread, having left the clamps, see FIG. 19, will now extend from the jaws through the guide eye 53 to the structure shown in FIG. 2. The lay will have an appreciable rearward motion before reaching the time in the loom cycle for picking and during this time the carrier will begin to move to the left due to action of the cam 84 and lever 71. The jaws will move rearwardly prior to picking as indicated in FIGS. 20–22.

The carrier in moving to the left causes the relative positions of the jaws and guide eye 53 to change successively through the positions indicated in FIGS. 20, 21 and 22 and draw weft from the supply. When the shuttle is picked, therefore, the weft is moving toward the shuttle so that the latter when picked finds the weft in motion toward it and it is not required to move the filling from the position of complete rest as is the case in other types of looms of this general class.

The diagrammatic views FIGS. 15–18 shows the clamps 50 and 51 to be in front of the shuttle a considerable distance in advance of the reed line RL shown in FIG. 23.

As the shuttle continues to move to the left the carrier will also move to the left along its oblique path CP, FIG. 23, and when the carrier reaches to adjacent position with respect to the selvage the clamps will be aligned with the abutting surface 176 awaiting reception of the weft which extends from the supply through the guide eye 53 into the shed and to the shuttle which is now on the other side of the loom. As the lay reaches its forward position the clamps will be separated by the wedge 175 as already described and the thread will pass between the clamps. During the first part of the next backward stroke of the lay the clamps will close to grip the thread while the latter is still intact from the supply to the shuttle at the left-hand side of the loom. Shortly after closing the clamp the thread will be cut adjacent to the selvage by a mechanism to be described.

The loom is now one pick later in its operation than it was at the time of transfer of the thread from the clamps to the jaws as contemplated in FIG. 17. It will be seen that the clamps pass somewhat behind the reed line with the lay on front center so that they can grip the thread just laid by the shuttle. The clamps have therefore moved from a position considerably in front of the reed line to a position slightly behind the line and it becomes apparent why it is necessary to cause the carrier to move along its oblique path CP.

As the lay continues to move rearwardly during the second pick of the loom cycle the carrier will be moved outwardly or from its adjacent position relative to the selvage to its remote position and will attain the latter position before the parts again occupy the position shown in FIG. 14.

It will be noted that the guard wire 170 is in position not only to permit the shuttle to be picked without entanglement of the weft with any of the box front parts, but it will also be noted that when the carrier begins its return motion from its adjacent position when the clamps are slightly behind the reed line wire 170 will also prevent entanglement of the now new thread held by the clamps 50–51 as they move outwardly.

When the shuttle returns from the other side and is boxed at the right-hand end a thread extends from its trailing end to the adjacent selvage and this thread must be cut and removed. Mechanisms for accomplishing this result are shown in FIGS. 1, 11 and 12.

The cutter includes a blade 180 between flared guides 181 fixed with respect to the loom frame. A pair of spaced blades 182 are pivoted at their rear ends at 183 to a lever 184 which is pivoted at 185 to the lay. The upper end 186 of lever 184 projects above pivot 185 in position to strike a fixed abutment 187 as the lay moves forwardly. Normally the lever and blades 182 are held in rear position in any approved manner, as by a coiled spring 188. A fixed guide pin 189 extends through slot 190 in cutter blades 182. The cutting is effected close to the selvage and the end of the thread leading to the shuttle is held temporarily between one of the guides 181 and the adjacent blade 182 until the lay has moved rearwardly a slight distance.

The thread remover includes a wire 195 swingably mounted with respect to the lay. A holder 196 to which the wire is secured pivots around a stud 197 secured to the lay above the path of the shuttle. A coiled spring 198 around the stud tends to hold the wire 195 to the right of the position shown in FIG. 12. An abutment 199 fixed to the loom frame is positioned to be struck by a part of the holder 196 above stud 197 as the lay approaches front center. In this way the end of the thread which has been released by the trailing shuttle jaws, see FIG. 11, is moved by the wire toward a vacuum device 200 which sucks in this end, and when the thread is released at the cutter during the ensuing rearward motion of the lay the device 200 removes the thread from the loom.

The remover wire 195 operates at each forward beat of the lay but is effective to have the removing operation only on every other beat. Thus, in FIG. 11 the thread has been released by the trailing jaws of the shuttle and is held at the cutter and in this instance, the shuttle just having been received from the opposite side, the wire is effective as a remover. On the intervening picks, however, when the thread extends from the supply into the shed and is beaten up at front center the thread will be held at its left end at the cutter and at its right end by the supply and the wire is therefore not effective to remove this thread since it is held at each side of the wire.

With both the jaws on the shuttle and the clamps on the carrier there is a slight period after front center before closure occurs to grip the thread. With respect to the jaws, for instance, the thread is snapped rather deeply into the jaws at front center, see FIG. 17, and does not have a chance to pull out of the jaws before the latter close. A similar condition exists with respect to the clamps when the carrier is in its adjacent position and the thread extending diagonally forwardly from the front surface of the abutment 176 to the adjacent reed will be snapped forwardly between the clamps 50–51 at front center and will not have a chance to pull out of this position before the clamps are able to grip it during the immediately following backward motion of the lay.

The cable system shown in FIGS. 9 and 24 is an actuating means which requires two beats of the loom for its complete operation, this means being effective on one beat to move one of the carriers to its remote position while moving the other carrier to its adjacent position, and on the next beat the motion of the carriers is reversed.

The greater part of the foregoing description has been given with respect to the parts at the right-hand side of the loom as viewed in FIG. 1, but, as already stated, it is to be understood that the left-hand side of the loom is provided with the same mechanisms and parts which operate in a manner similar to the operation of the right-hand parts. The fact that there are two packages or supplies of weft makes it possible to produce pick and pick fabrics wherein a pick of filling drawn from one supply is followed by another pick drawn from the other supply.

The picker as shown for instance at the right-hand side of FIG. 1 is held against outward motion, that is, motion to the right by the usual construction of the lay and can therefore act as a stop to arrest motion of the shuttle before the shuttle box necessarily completes its motion to picking position.

We claim:

1. In a loom having a stationary weft supply and a backwardly and forwardly reciprocating lay provided with a beat-up reed, a carrier movable from a position remote from the selvage to a position adjacent to the selvage and back to the remote position, a weft clamp on the carrier, the weft extending from the supply to and held by the clamp when the carrier is in its remote position, a shuttle having weft gripping jaws located beyond the weft clamp with reference to the cloth when the carrier is in its remote position, means operated incident to forward beat of the lay effective to cause the jaws to grip the weft, subsequent rearward movement of the lay causing the jaws to disengage the weft held by them from the clamp, actuating mechanism effective to move the carrier to its position adjacent to the selvage prior to completion of the next forward motion of the lay to locate the clamp in the path of the weft being beaten up by the reed, means operating incident to beat-up causing the clamp to clamp the weft, cutting means thereafter severing the weft between the selvage and clamp, and said actuating mechanism thereupon returning the carrier to its remote position with the weft extending from the clamp to the supply preparatory to the next threading of the jaws.

2. The loom set forth in claim 1 wherein tension and takeup means engaging the weft between the supply and clamping means includes a resilient element which is deformed from its normal shape when the mechanism begins to return the carrier to its remote position and tends to assume its normal shape to tension the weft as the carrier returns to its remote position.

3. In a loom having a stationary weft supply and a backwardly and forwardly reciprocating lay provided with a beat-up reed, a carrier movable from a position remote from the selvage of the cloth to a position adjacent to the selvage and back to the remote position, a weft guide eye on the carrier, a weft clamp on the carrier nearer to the selvage than is the guide eye, the weft extending from the supply through the eye to and held by the clamp when the carrier is in its remote position, a shuttle having weft gripping jaws located intermediate the eye and clamp preparatory to threading of the jaws with the weft, means effective first to open the jaws to receive the weft and then effect closing of the jaws to grip the weft when the lay is in the forward part of its motion, the clamp and eye cooperating to place the weft for gripping by the jaws, subsequent rearward movement of the lay causing the jaws to disengage the weft held by them from the clamp, actuating mechanism effective to move the carrier to a position adjacent to the selvage prior to completion of the next forward motion of the lay to locate the clamp in the path of the weft extending through the eye and being beaten up by the reed, means operating incident to beat-up causing the clamp to clamp the weft, cutting means thereafter severing the weft between the selvage and clamp, and said actuating mechanism thereupon returning the carrier to its remote position with the weft exetnding from the clamp through said eye to the supply preparatory to the next threading of the jaws.

4. The loom set forth in claim 3 wherein tension and takeup means engaging the weft between the supply and the guide eye are effective to hold the weft taut between the guide eye and clamp when the weft is being gripped by the jaws preparatory to a picking operation and effective later in the operation of the loom after the weft has been disengaged from the clamp and the carrier has been moved to its position adjacent to the selvage and the weft has been attached to the clamp to maintain the weft taut as the mechanism returns the carrier from its adjacent position to its remote position.

5. In a loom having stationary weft supply and a backwardly and forwardly reciprocating lay provided with a beat-up reed, a shuttle box mounted on the lay for movement along the lay in a direction away from the cloth, a shuttle which enters the box having normally closed thread gripping jaws thereon, means moving the shuttle box with the shuttle therein along the lay during forward motion of the lay subsequent to entry of the shuttle into the box to locate the gripping jaws at a predetermined distance from the selvage of the cloth, a carrier movable on the loom in a direction toward and from the selvage of the cloth, thread clamping means on the carrier, actuating mechanism moving the carrier to a position locating the clamping means adjacent to the gripping jaws but at a less distance from the selvage than said predetermined distance, the weft from the supply being held by the clamping means and passing in front of the gripping jaws, and means operating incident to forward motion of the lay to open the gripping jaws to receive the weft and operating incident to the next backward motion of the lay to cause the jaws to grip the weft so that the weft is temporarily held by both the gripping jaws and the clamping means, the jaws exerting more holding force on the weft than the clamping means and pulling the weft away from the clamping means as the lay moves backwardly preparatory to picking of the shuttle.

6. In a loom having a stationary weft supply and a backwardly and forwardly reciprocating lay provided with a beat-up reed and a shuttle picker normally held against a stop limiting its motion away from the cloth, a shuttle box mounted for endwise movement on the lay toward the picker from a shuttle receiving position to a shuttle picking position, a shuttle having thread gripping jaws thereon normally closed but separable to receive a weft thread, a weft clamp in front of the shuttle box to clamp and hold the weft extending from said supply mounted on the loom independently of the lay and normally at a predetermined distance from the adjacent selvage of the cloth, box moving means operative subsequent to arrival of the shuttle in said box to move the box relative to the lay in a direction toward the picker to locate the box in picking position and cause a slightly misplaced shuttle to engage the picker to insure location of the jaws on the shuttle in a position more distant from the selvage than said predetermined distance to place the jaws behind a part of the weft extending from the clamp to the supply, and means effective thereafter to cause the jaws to separate to receive the weft and then effect closing of them to grip the weft.

7. The loom set forth in claim 6 wherein operation of said box moving means is dependent upon forward movement of the lay.

8. The loom set forth in claim 6 wherein said box moving means holds the box in said picking position with the shuttle against the picker until after picking of the shuttle and then returns the shuttle box to shuttle receiving position.

9. The loom set forth in claim 6 wherein the shuttle box is slidable on the lay and the shuttle box moving means includes a lever pivoted on the lay one end of which is operatively connected to the box and the other end of which is moved by a member on a fixed part of the loom as the lay moves forwardly.

10. The loom set forth in claim 9 wherein the member is a cam plate slidable forwardly and backwardly between front and rear extreme positions, the plate being in its front position when the lay is moving forwardly to delay rocking of the lever until after the shuttle is boxed, and the lever during backward motion of the lay causing the plate to move to its rear position before the plate is effective to rock the lever to delay movement of the box to its receiving position until after the shuttle is picked.

11. In a loom having a stationary weft supply and a backwardly and forwardly reciprocating lay, a carrier provided with a thread clamp and a thread guide eye, the weft extending from the supply through the eye to the clamp, a shuttle on the lay provided with thread gripping jaws, the shuttle being picked when the lay reaches a given point in its backward motion, and means transferring the weft from the clamp to the jaws when the lay is in the forward part of its motion, the lay thereafter moving rearwardly and causing the weft to be drawn from the supply through the eye to require the weft to be in motion in a direction toward the shuttle when the lay reaches said point.

12. In a loom having a stationary weft supply and a backwardly and forwardly reciprocating lay and having a shuttle box thereon, a shuttle which enters the box having normally closed thread gripping jaws thereon, a carrier movable on the loom from a position remote from the selvage of the cloth to a position adjacent to the selvage, thread clamping means on the carrier to hold the weft from said supply, means effecting transfer of the weft from the clamping means to the gripping jaws when the lay is in the forward part of its motion, carrier actuating mechanism thereafter moving the carrier from its remote position to its adjacent position, means causing the clamping means to clamp the weft on the next forward beat of the lay, said mechanism thereafter moving the carrier from its adjacent to its remote postition prior to completion of the next forward beat of the lay, said actuating mechanism including a pulley rotatable on each end of the loom, a cable connected to the carrier and trained around said pulleys and having its ends fixed and pulley means around which each end of the cable is wrapped reciprocating transversely of the loom to effect said movements of the carrier.

13. In a loom having a stationary weft supply at each end thereof, a carrier on each end of the loom provided with a weft clamp and movable to move the associated clamp from an outer weft transfer position remote from the adjacent selvage to a weft pick-up position adjacent to the selvage, a shuttle having weft gripping jaws on each end thereof, means at each end of the loom to effect transfer of weft from the clamp when the latter is in its remote position to the jaws on the shuttle which will be on the trailing end of the shuttle when the latter is next picked, means at each end of the loom enabling the clamp when in its adjacent position to clamp the weft just laid by the shuttle, and carrier actuating mechanism common to said carriers effective when the shuttle is at either end of the loom to locate the weft clamp of the carrier at that end of the loom in its remote position and locate the clamp of the carrier on the other end of the loom in its adjacent position, said actuating mechanism including a pulley rotatable on each end of the loom, a cable connected to each of the carriers and trained around said pulleys and having its ends fixed, and pulley means around which each end of the cable is trained, said last named means moving in one direction on one beat of the loom and moving in the opposite direction on the next beat of the loom.

14. In a loom having a stationary weft supply and a backwardly and forwardly reciprocating lay provided with a raceplate, a shuttle box mounted on the lay for endwise motion along the lay from a shuttle receiving position away from the cloth to a shuttle picking position, a shuttle having gripping jaws to receive an end of the weft supply, a base plate for the box slidable along the lay and aligned with the raceplate, a back forming part of the box extending upwardly from said base, a shuttle binder secured to said back over said base, box guide means fixed to the lay overhanging parts of the box to prevent upward displacement thereof with respect to the lay, and means extending rearwardly from said back by which the box can be slid along the lay from the shuttle receiving to the shuttle picking position thereof to locate the shuttle when in the box with its gripping jaws in weft receiving position.

15. The loom set forth in claim 14 wherein the front of the box is open to enable the end of the weft supply to be attached to the gripping jaws of the shuttle in the box.

16. The loom set forth in claim 14 wherein there is provided a picker aligned with the shuttle when the latter is in the box and means are provided to move the box in a direction toward the picker to cause the latter to engage and arrest motion of the shuttle to place said jaws in position to receive the weft.

17. The loom set forth in claim 14 wherein said box guide means has a part which overhangs the forward part of the base plate and has another part which overhangs part of the back of the box.

18. In a loom having a stationary weft supply and a backwardly and forwardly reciprocating lay provided with a beat-up reed, a carrier movable from a position remote from the selvage to a position adjacent to the selvage and back to the remote position, a weft clamp on the carrier, the weft extending from the supply to and held by the clamp when the carrier is in its remote position, a shuttle rearward of the clamp having weft gripping jaws located beyond the weft clamp with reference to the cloth when the carrier is in its remote position, means operated incident to forward beat of the lay to effect transfer of weft from the clamp to the jaws, actuating mechanism effective to move the carrier to its position adjacent to the selvage prior to completion of the next forward motion of the lay to locate the clamp in the path of the weft being beaten up by the reed, means operating incident to beat-up causing the clamp to clamp the weft, and a carrier guide for the carrier oblique with respect to the reed line when the lay is on front center, said carrier guide causing the clamp to be forward of the reed line when the carrier is in its remote position by an amount equal at least to the thickness of that part of the shuttle behind the clamp when the shuttle jaws are in weft receiving position, and said carrier guide causing the clamp to project behind the reed line when the carrier is in its adjacent position.

19. In a thread clamp carrier for a loom operating with a stationary weft supply and a shuttle provided with thread gripping jaws which when moved rearwardly relative to the shuttle opens to receive the weft when the lay is near its front center position, a pair of thread clamps on the carrier to hold the weft extending from the supply, and a pressure plate fixed to the carrier in position to engage said jaws and move them rearwardly relative to the shuttle as the lay moves forwardly to open said jaws to enable them to receive said weft held by the clamp.

20. The carrier set forth in claim 19 wherein the carrier has mounted thereon a thread guide eye for the weft beyond said pressure plate with reference to said clamps so that said plate is between the clamps and the guide eye.

21. The carrier set forth in claim 20 wherein a resilient thread placer is mounted on the carrier and has a part between the guide eye and pressure plate provided with a thread receiving notch effective to place the thread favorably for reception by said jaws.

References Cited in the file of this patent

UNITED STATES PATENTS

| | | |
|---|---|---|
| 432,046 | Hodgson et al. | July 15, 1890 |
| 2,420,380 | Moessinger | May 13, 1947 |